Patented Feb. 6, 1934

1,946,109

UNITED STATES PATENT OFFICE 1,946,109

PRODUCTION OF CATALYSTS

Mathias Pier, Heidelberg, and Karl Winkler, Ludwigshafen-on-the-Rhine, Germany, assignors, by mesne assignments, to Standard-I. G. Company, Linden, N. J., a corporation of Delaware No Drawing. Application July 29, 1931, Serial No. 553,882, and in Germany January 6, 1928

4 Claims. (Cl. 23—236)

This application is a continuation in part of our prior application Ser. No. 330,135 filed January 3rd, 1929.

This invention relates to improvements in the manufacture and production of catalysts, and in particular of such as may be employed in the destructive hydrogenation of carbonaceous materials, such as varieties of coal, tars, mineral oils, the extraction, conversion and distillation products thereof and the like.

It is known that catalysts have frequently been obtained according to the methods hitherto employed, which were very active but showed little or no mechanical stability, and which were decomposed into such of pulverulent or mealy nature.

We have now found that any catalysts which by themselves have little or no mechanical stability, for example those of a pulverulent or mealy nature, can likewise be converted into an extremely stable and resistant, lump-like, coherent form by incorporating finely divided substances containing iron or other metals of the iron group in the metallic state, that is to say in the form of metals or alloys of the same, under which term fall also the carbides which, as is known, are very related in their physical and chemical properties to the alloys of these metals with other metals. The said metallic substances are employed either alone or in admixture with one another or with other substances with the constituents usually employed in the manufacture of catalysts, for example with the oxides and hydroxides of heavy metals or earth metals, and in particular oxides of metals of the 6th group of the periodic system, such as chromium oxide, molybdic acid, or tungstic acid, and usually with the said constituents in the form of aqueous pastes. As examples of the aforesaid other substances suitable for addition may be mentioned activators, such for example as metal salts, alkali metal salts or hydroxides and the like, or substances having an acid action when dissolved in water. An admixture of soluble magnesium compounds, for example of magnesium chloride, in addition to the materials above mentioned has been found to be of particular advantage.

The process is usually carried out by incorporating one or more of the said metals or alloys or carbides thereof in a finely divided state with an aqueous paste of the constituents of the catalyst and subjecting the said mixture to a mechanical treatment, for example grinding or kneading together, during which treatment the temperature is preferably not allowed to rise above about 50° C. A kneading treatment is, for example, a very advantageous form of such mechanical treatment. If the temperature rises higher, the products obtained are usually too porous. The catalysts are thereupon gradually dried. In this manner very stable masses are obtained, usually with the evolution of gases.

The quantity of metal powder and the like necessary for the hardening may be very small. When the substances employed for the hardening are also capable of simultaneously exerting a catalytic action in the process for which the hardened catalysts are to be employed, it is frequently advantageous to add more than the quantity necessary for the hardening. The addition of small quantities of other substances, as for example substances having an acid or an alkaline reaction when dissolved in water, frequently accelerates the hardening process and the evolution of gases. In cases where these additions would be injurious to the catalytic action, they can be removed after the stabilization has occurred, for example by washing out or by heating to a high temperature or the like. It is frequently advantageous to employ mixtures of several of the said finely divided metals, or of these metals with the said metal carbides or with finely divided alloys of the said metals, or of the said metal carbides with alloys of the said metals and in this case part of these can have special catalytic activity whilst the others serve more for the mechanical stabilization.

The above mentioned destructive hydrogenation for which the catalysts prepared according to the present invention have proved to be of particular advantage, is carried out at temperatures ranging between 300° and 700° C., at pressures of at least 50 atmospheres and in the presence of hydrogen.

The following example will further illustrate the nature of this invention, but the invention is not restricted thereto.

Example

A catalyst consisting of a mixture of molybdic acid, zinc oxide and magnesium oxide, which very actively promotes the cracking and hydrogenating of hydrocarbons is mixed and pasted up with 3 per cent of its weight of a very fine dust of metallic cobalt. The mass obtained the stability of which is considerably enhanced, causes an increase in the yield of benzine of 5 per cent with reference to that obtained with the mass not containing dust of cobalt.

A similar increase in benzine yield may be obtained by mixing the catalyst with iron or nickel powder in place of cobalt.

What we claim is:

1. In the production of solid sulphur immune catalytic masses, the steps of distributing in a paste of the constituents thereof a finely divided metal selected from the class consisting of iron, nickel and cobalt, carbides of the same and alloys containing one of the said metals and gradually drying the resulting mixture.

2. In the production of solid sulphur immune catalytic masses, the steps of distributing in a paste of the constituents thereof a finely divided metal selected from the class consisting of iron, its carbide, and alloys containing iron, subjecting the resulting mixture to a kneading treatment at a temperature not exceeding 50° C., and gradually drying the resulting mixture.

3. The process as defined in claim 1 wherein the aqueous paste after incorporation of the finely divided metal is subjected to a kneading treatment at a temperature not exceeding 50° C. prior to its being dried.

4. The process as defined in claim 2 wherein the finely divided metal is iron.

MATHIAS PIER.
KARL WINKLER.